(12) United States Patent
Burcham et al.

(10) Patent No.: US 8,630,747 B2
(45) Date of Patent: Jan. 14, 2014

(54) ALTERNATIVE AUTHORIZATION FOR TELEMATICS

(75) Inventors: Robert H. Burcham, Overland Park, KS (US); Jason R. Delker, Olathe, KS (US); Robin D. Katzer, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/471,107

(22) Filed: May 14, 2012

(65) Prior Publication Data
US 2013/0304281 A1 Nov. 14, 2013

(51) Int. Cl.
*G05D 1/00* (2006.01)
*G05D 3/00* (2006.01)
*G06F 7/00* (2006.01)
*G06F 17/00* (2006.01)

(52) U.S. Cl.
USPC .................................... 701/2; 701/4

(58) Field of Classification Search
USPC ..................... 701/2, 1, 104, 209, 31.4; 726/6; 713/151; 704/270.1, 201
See application file for complete search history.

(56) References Cited

U.S. PATENT DOCUMENTS

| | | | |
|---|---|---|---|
| 6,622,083 B1 | 9/2003 | Knockeart et al. | |
| 7,209,964 B2 | 4/2007 | Dugan et al. | |
| 7,366,892 B2 * | 4/2008 | Spaur et al. | 713/151 |
| 7,376,392 B2 | 5/2008 | Myojo | |
| 7,454,473 B2 | 11/2008 | Suzuki | |
| 7,912,224 B2 | 3/2011 | Lee et al. | |
| 7,966,111 B2 | 6/2011 | Moinzadeh et al. | |
| 8,548,532 B1 | 10/2013 | Ng | |
| 2003/0096641 A1 | 5/2003 | Odinak | |
| 2003/0120601 A1 | 6/2003 | Ouye et al. | |
| 2004/0125957 A1 | 7/2004 | Rauber et al. | |
| 2005/0021744 A1 | 1/2005 | Haitsuka et al. | |
| 2005/0065779 A1 * | 3/2005 | Odinak | 704/201 |
| 2005/0113102 A1 | 5/2005 | Kwon et al. | |
| 2007/0113269 A1 | 5/2007 | Zhang | |
| 2007/0124043 A1 * | 5/2007 | Ayoub et al. | 701/36 |
| 2007/0124045 A1 * | 5/2007 | Ayoub et al. | 701/36 |
| 2007/0124046 A1 * | 5/2007 | Ayoub et al. | 701/36 |
| 2007/0160199 A1 * | 7/2007 | Sekiguchi et al. | 380/28 |
| 2008/0072047 A1 | 3/2008 | Sarikaya et al. | |
| 2008/0148374 A1 * | 6/2008 | Spaur et al. | 726/6 |
| 2008/0307086 A1 | 12/2008 | Brooks et al. | |
| 2009/0028082 A1 | 1/2009 | Wynn et al. | |

(Continued)

FOREIGN PATENT DOCUMENTS

JP 20062441 A 9/2006

OTHER PUBLICATIONS

First Action Interview Pre-Communication dated Aug. 21, 2012, U.S. Appl. No. 13/218,503, filed Aug. 26, 2011.

(Continued)

*Primary Examiner* — Thomas Black
*Assistant Examiner* — Robert Payne (57) ABSTRACT

A system for alternative authorization for telematics in a vehicle is disclosed. The system comprises a telematics unit residing in the vehicle, a radio transceiver, and a digital rights management application executing on the telematics unit. The radio transceiver couples the telematics unit with a wireless service provider. The digital rights management application receives a remote operation request, maps the remote operation request to vehicle specific instructions contained in the digital rights management application, and executes the vehicle specific instructions on the telematics unit.

20 Claims, 7 Drawing Sheets

(56) References Cited

U.S. PATENT DOCUMENTS

| | | | |
|---|---|---|---|
| 2009/0109941 | A1 | 4/2009 | Carter |
| 2010/0097239 | A1* | 4/2010 | Campbell et al. ......... 340/825.25 |
| 2010/0197362 | A1 | 8/2010 | Saitoh et al. |
| 2010/0220250 | A1 | 9/2010 | Vanderwall et al. |
| 2010/0235285 | A1 | 9/2010 | Hoffberg |
| 2010/0260350 | A1 | 10/2010 | Chutorash et al. |
| 2011/0099316 | A1 | 4/2011 | Tseng et al. |
| 2011/0257973 | A1 | 10/2011 | Chutorash et al. |
| 2011/0263293 | A1 | 10/2011 | Blake et al. |
| 2011/0295444 | A1* | 12/2011 | Westra et al. ...................... 701/1 |
| 2011/0310731 | A1 | 12/2011 | Park et al. |
| 2012/0109406 | A1* | 5/2012 | Yousefi et al. .................... 701/1 |
| 2012/0134497 | A1 | 5/2012 | Roitshtein et al. |
| 2012/0183221 | A1 | 7/2012 | Alasry et al. |
| 2012/0203557 | A1* | 8/2012 | Odinak ...................... 704/270.1 |
| 2012/0282895 | A1* | 11/2012 | Bai et al. ....................... 455/410 |

OTHER PUBLICATIONS

First Action Interview Office Action dated Jan. 3, 2013, U.S. Appl. No. 13/218,503, filed Aug. 26, 2011.
Final Office Action dated May 7, 2013, U.S. Appl. No. 13/218,503, filed Aug. 26, 2011.
First Action Interview Pre-Interview Communication dated Oct. 26, 2012, U.S. Appl. No. 13/156,438, filed Jun. 9, 2011.
Notice of Allowance dated Feb. 26, 2013, U.S. Appl. No. 13/156,438, filed Jun. 9, 2011.
First Action Interview Pre-Communication dated Jan. 31, 2012, U.S. Appl. No. 13/246,554, filed Sep. 27, 2011.
FAIPP Office Action dated May 21, 2012, U.S. Appl. No. 13/246,554, filed Sep. 27, 2011.
Final Office Action dated Sep. 5, 2012, U.S. Appl. No. 13/246,554, filed Sep. 27, 2011.
Advisory Action dated Nov. 2, 2012, U.S. Appl. No. 13/246,554, filed Sep. 27, 2011.
Office Action dated Dec. 5, 2012, U.S. Appl. No. 13/246,554, filed Sep. 27, 2011.
Notice of Allowance dated May 20, 2013, U.S. Appl. No. 13/246,554, filed Sep. 27, 2011.
Aboda, B., et al., "Exentsible Authentication Protocol (EAP)", Network Working Group, RFC 3748, Standards Track, Jun. 2004.
Shipley, Trevor D., et al. Patent Application entitled "Mobile Communication System Identity Pairing," filed Aug. 26, 2011, U.S. Appl. No. 13/218,503.
Bertz, Lyle T., et al., Patent Application entitled "Secure Changing Auto-Generated Keys for Wireless Access," filed Jun. 9, 2011, U.S. Appl. No. 13/156,438.
Ng, Sei Y., Patent Application entitled "Head Unit to Handset Interface and Integration," filed Sep. 27, 2011, U.S. Appl. No. 13/246,554.
Bertz, Lyle T., et al. Patent Application entitled "Automotive Multi-Generation Connectivity," filed Apr. 26, 2011, U.S. Appl. No. 13/094,494.
Annan, Brandon C., et al. Patent Application entitled "Methods and Systems of Digital Rights Management for Vehicles," filed May 3, 2012, U.S. Appl. No. 13/463,799.
Burcham, Robert H., et al. Patent Application entitled "In-car Head unit Wireless Communication Service Subscription Initialization," filed Apr. 24, 2012, U.S. Appl. No. 13/455,121.
Bloomcamp, Eric Michael, et al. Patent Application entitled "Dual Path In-Vehicle Communication," filed Feb. 15, 2012, U.S. Appl. No. 13/769,268.
Bonn, Michael J., et al. Patent Application entitled "System and Method of Utilizing Driving Profiles via a Mobile Device," filed Mar. 15, 2012, U.S. Appl. No. 13/844,226.
Ng, Sei Y., Patent Application entitled "Head Unit to Handset Interface and Integration," Filed on Aug. 20, 2013, U.S. Appl. No. 13/971,658.
Bloomcamp, Eric M., et al., Patent Application entitled Authenticating Mobile Device for On Board Diagnostic System Access, filed on Sep. 23, 2013, U.S. Appl. No. 14/034,475.
Advisory Action dated Aug. 1, 2013, U.S. Appl. No. 13/218,503, filed on Aug. 26, 2011.

* cited by examiner

ALTERNATIVE AUTHORIZATION FOR TELEMATICS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telematics is the integrated use of telecommunications and informatics for application in vehicles and with control of vehicles. Vehicle manufacturers have historically offered customers proprietary services and have been dependent on a single service provider for delivery of these services in a specific market. This supply chain inflexibility made it difficult for providers to gain economies of scale and advance their offerings. Next Generation Telematics Pattern (NGTP) is an approach for delivering wireless services to in-vehicle devices, with the focus on open interfaces across the service delivery chain. With the proliferation of new wireless technologies it is likely that in-vehicle devices will access services using multiple methods, technologies, and service providers.

Digital rights management (DRM) is an access control technology used by hardware manufacturers, publishers, copyright holders and individuals with the intent to limit the use of digital content. Digital rights management is a technology that may inhibit uses of digital content that are not desired or intended by the content provider. Common digital rights management techniques include encryption, scrambling, and the embedding of a tag.

SUMMARY

In an embodiment, a method of alternative authorization for telematics in a vehicle is disclosed. The method comprises receiving a remote operation request by a digital rights management application executing on a telematics unit residing in the vehicle, mapping the remote operation request to vehicle specific instructions contained in the digital rights management application, and executing the vehicle specific instructions on the telematics unit by the digital rights management application.

In an embodiment, a system for alternative authorization for telematics in a vehicle is disclosed. The system comprises a telematics unit residing in the vehicle, a radio transceiver, and a digital rights management application executing on the telematics unit. The radio transceiver couples the telematics unit with a wireless service provider. The digital rights management application receives a remote operation request, maps the remote operation request to vehicle specific instructions contained in the digital rights management application, and executes the vehicle specific instructions on the telematics unit.

In an embodiment, a method of alternative authorization for telematics in a vehicle is disclosed. The method comprises coupling a mobile electronic device to a telematics unit residing in the vehicle over a Bluetooth wireless connection, sending a remote operation request from an application executing on the mobile electronic device to the telematics unit, receiving the request by a digital rights management application on the telematics unit, mapping the request to vehicle specific instructions contained in the digital rights management application, and executing the vehicle specific instructions on the telematics unit by the digital rights management application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Telematics is the integrated use of telecommunications and informatics to provide over-the-air services in vehicles. One such service is the ability to perform remote actions on a vehicle, such as turning off the lights, unlocking the doors, or starting the engine. Performing remote operations on a vehicle may previously have relied upon intelligence in the network to identify the vehicle type, to verify the vehicle is authorized to use the service, and to locate a script with the appropriate commands for the vehicle type. The script was then sent wirelessly to the telematics unit in the vehicle to be executed by a scripting agent in the firmware of the telematics unit. This solution presents limitations by using a remote operations client in the network to perform the bulk of the functions and thus relying upon network access to utilize the service. Additionally, updated functionality or new services added might depend upon a firmware update of the telematics unit to deploy the update.

A system and method of alternative authorization for telematics in a vehicle is disclosed, providing a new architecture for remote actions which leverages a digital rights management package (DRM) to support remote actions controlled in the telematics unit without relying upon decisions or instructions from the remote operations client. This increases flexibility and updateability including allowing for the use of java applications residing outside of the firmware of the telematics unit to undertake remote actions which may be easily updated without firmware upgrades. The system also enables bypassing the requirement of network access by allowing a local wireless connection to the telematics unit in the vehicle to use the local digital rights management for permission to execute the remote actions.

The digital rights management application on the telematics unit executes in a Java runtime environment and receives remote commands, verifies through the digital rights management that the vehicle is subscribed to the service requested in the commands, and executes vehicle specific instructions to perform the actions specified by the remote commands. The remote commands are encoded with digital rights management and are decoded by the digital rights management application executing on the telematics unit. The remote commands are abstracted high-level commands which are translated into the vehicle specific instructions contained within the digital rights management application. Because the vehicle specific instructions are contained within the digital rights management application as opposed to on the network, less bandwidth may be needed for communication over the network, and remote operation may be possible with a lower data rate. When network access is available, the remote commands may be sent by a remote operations client, where the remote operations client may execute on the wireless service provider network. For example, a customer service representative may interface with the remote operations client to send a remote command over the wireless network to unlock the vehicle doors upon receiving a call from the vehicle owner.

Alternatively, the system also enables sending a remote command to the telematics unit over a local wireless connection such as a Bluetooth wireless connection when network access is not available. A mobile phone or other handheld device may establish a wireless connection with the telematics unit. An application on the mobile phone allows selecting a remote command to send over the wireless connection to the telematics unit. The digital rights management application on the telematics unit receives the remote command, performs the digital rights management authorization, and executes the vehicle specific instructions to perform the requested action.

Figure 1:
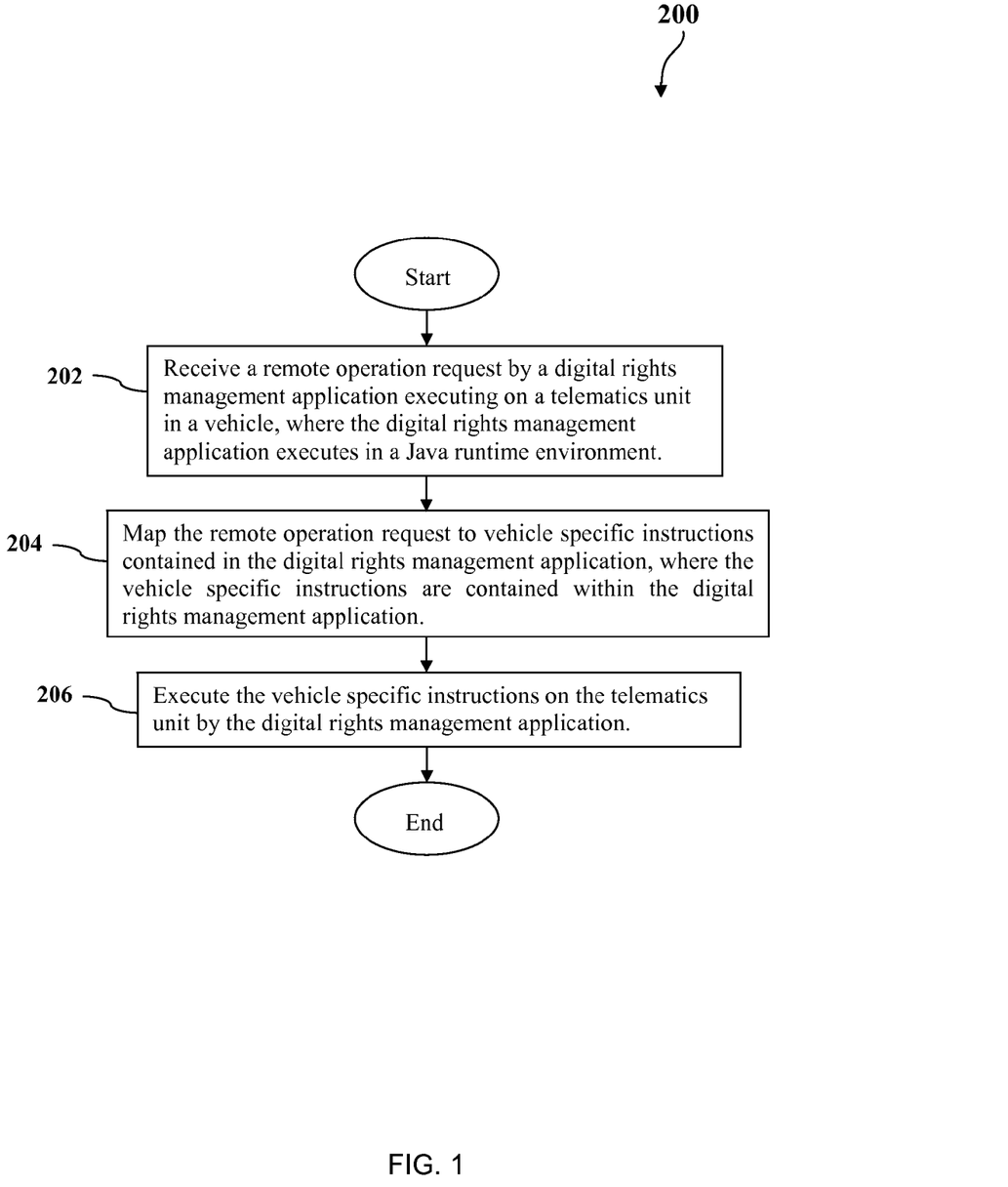
FIG. 1 is a flow chart of a method according to an embodiment of the disclosure.

Turning now to FIG. 1, a method 200 of alternative authorization for telematics in a vehicle is described. At block 202, a remote operation request is received by a digital rights management application executing on a telematics unit in a vehicle, where the digital rights management application executes in a Java runtime environment. Executing in a Java runtime environment allows the digital rights management application to reside outside of the firmware of the telematics unit and to be easily updated without firmware upgrades. The digital rights management application listens for incoming remote commands over the network and processes them as they are received. At block 204, the remote operation request is mapped to vehicle specific instructions contained in the digital rights management application, where the vehicle specific instructions are contained within the digital rights management application. The remote operation request is an abstracted command that the digital rights management application translates to individual functions specific to the vehicle. The digital rights management application may translate a single abstract command to multiple vehicle specific instructions to complete the abstracted command. Because the vehicle specific instructions are contained within the digital rights management application as opposed to on the network, less bandwidth may be needed to receive the remote operation request and remote operation may be possible with a lower data rate. At block 206, the vehicle specific instructions are executed on the telematics unit by the digital rights management application. The digital rights management application then executes the vehicle specific instructions to perform the action requested in the remote operation request.

In an embodiment, the remote operation request is encoded with digital rights management. Encoding allows the remote operation request to be securely sent over the network to the telematics unit. The remote operation request may also include authorization information providing permissions for the request to be run on the vehicle. In an embodiment, the remote operation request is decoded by the digital rights management application and the digital rights management application determines if the remote operation request is authorized to execute remote commands on the telematics unit. The digital rights management application verifies the authorization information in the remote operation request before processing the remote command to ensure the request is sent from an authorized user. The digital rights management application also verifies the subscription rights of the telematics unit to ensure the vehicle is authorized to perform the remote command.

In an embodiment, mapping the remote operation request to vehicle specific instructions comprises translating abstracted remote operation commands to the specific format and commands required by the vehicle. The remote operation requests are abstracted commands which request a high-level function to be performed on the vehicle. The digital rights management application translates the abstracted command to the individual functions specific to the vehicle, which may require multiple vehicle specific instructions to complete the remote command. The vehicle specific instructions may be contained in the digital rights management application or may be located in a library file containing code and data to provide services to the digital rights management application. This may allow updates to the supported remote functions through over-the-air updates to the digital rights management application and/or the vehicle specific instructions.

Figure 2:
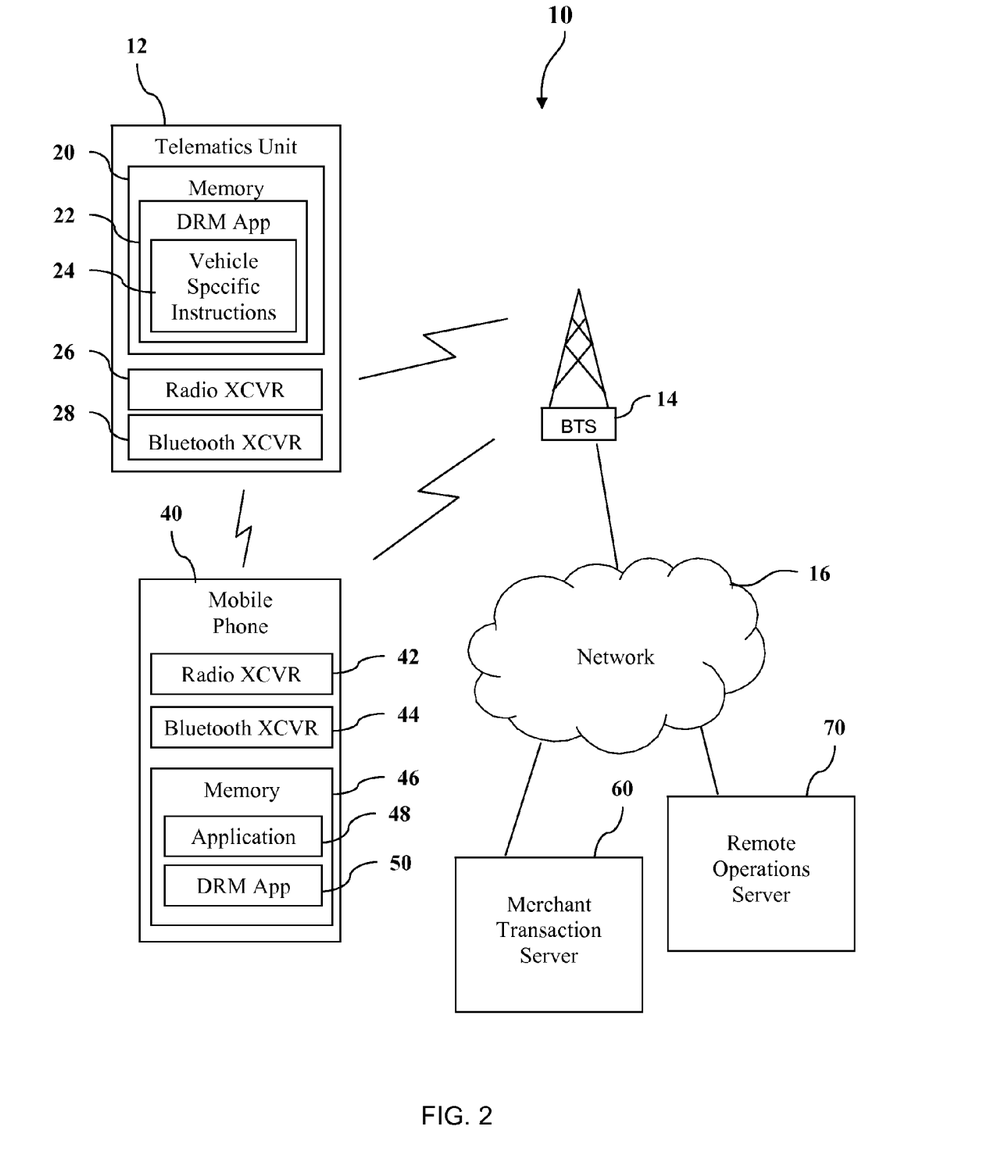
FIG. 2 is a block diagram of a system according to an embodiment of the disclosure.

Turning now to FIG. 2, a system 10 for alternative authorization for Next Generation Telematics Pattern in a vehicle is described. The system comprises a telematics unit 12, a base transceiver station 14, a network 16, a mobile phone 40, a merchant transaction server 60, and a remote operations server 70. The telematics unit 12 comprises a memory 20, a radio transceiver 26, and a Bluetooth transceiver 28. The memory 20 of the telematics unit 12 comprises a digital rights management application 22, and the digital rights management application 22 comprises vehicle specific instructions 24. The digital rights management application 22 may include software, instructions, and data files with the digital rights management data, and updating the digital rights management application may comprise updating the data files. The mobile phone 40 comprises a radio transceiver 42, a Bluetooth transceiver 44, and a memory 46. The memory 46 of the mobile phone 40 comprises an application 48, and a digital rights management application 50. The mobile phone 40, while shown as a mobile phone, may be a personal digital assistant (PDA), a media player, or other network enabled electronic device.

The base transceiver station 14 provides a communication link to the radio transceiver 26 and couples the telematics unit 12 to the network 16. In an embodiment, the base transceiver station 14 provides a wireless communication link to the radio transceiver 26 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the system 10 may comprise any number of base transceiver stations 14. The network 16 may be a public communication network, a private communication network, or a combination thereof. The network 16 may be a combination of a wireless network coupled to a wired network, where the wireless network is provided by a wireless service provider and accessed via a plurality of base transceiver stations 14.

The merchant transaction server 60 maintains an image of the digital rights management application 22. The merchant transaction server 60 tracks any new services purchased by the subscriber and updates the digital rights management application 22 when changes are made. The remote operations server 70 encodes remote operation requests with digital rights management and sends the encoded remote commands over the network 16 to the telematics unit 12. The remote operations server 70 provides an interface for a customer service application or a mobile phone application to send remote commands to the telematics unit 12. While the system 10 presents each of these functions on its own server, in other embodiments the functionality could be combined on a single server, or could be spread across a plurality of additional servers to support higher loads. A computer system suitable for implementing one or more embodiments is described hereinafter.

The digital rights management application 22 executing on the telematics unit 12 receives a remote operation request over a wireless connection to perform actions related to the vehicle and the functionality equipped on the vehicle. The wireless connection may be established via the radio transceiver 26 linking the telematics unit 12 to a mobile wireless service provider's network 16 through the base transceiver station 14. Upon receiving a remote operation request, the digital rights management application 22 maps the request to vehicle specific instructions 24 contained in the digital rights management application and executes the vehicle specific instructions 24 on the telematics unit 12.

In an embodiment, digital rights management application 22 decodes the remote operation request and verifies that the vehicle is subscribed to the requested service and authorized to execute the requested remote command. Implementing the digital rights management in the telematics unit 12 enables the ability to support remote commands over a local network even when the wireless network 16 is inaccessible. Once the authorization is complete, the digital rights management application 22 translates the remote operation request to the vehicle specific instructions 24 contained in the digital rights management application 22. The remote operation requests are abstracted commands which request a high-level function to be performed on the vehicle. The digital rights management application 22 translates the abstracted command to the individual functions specific to the vehicle, which may require multiple vehicle specific instructions 24 to complete the remote command.

For example, a remote command to unlock the doors of the vehicle is received by the telematics unit 12. The remote command is abstracted, i.e., it doesn't give the specific instructions of how to unlock the doors, the remote command requests only the high-level function to be performed. The digital rights management application 22 translates the request to unlock the doors, identifying that the vehicle is a four door vehicle, and maps the abstract unlock command to vehicle specific instructions 24 to unlock the driver's side front door, the driver's side rear door, the passenger's side front door, and the passenger's side rear door. The digital rights management application 22 then executes the vehicle specific instructions 24 to perform the action requested in the remote operation request.

In an embodiment, the remote operation request comprises at least one of a lock/unlock vehicle request, a start/stop vehicle request, and a lights on/off vehicle request. Remote services are a common use of telematics units 12 in vehicles. Performing remote operations on the vehicle may provide safety and convenience. Supported remote operations may include unlocking the vehicle if you have left your keys inside, or locking the vehicle after you are inside the store. Another supported remote operation may be to start the engine from inside the house to warm it up on a cold morning, or to stop the engine when you receive a phone call and are delayed. A third example of a remote operation is the ability to turn off the lights after leaving the vehicle, or to turn on the lights when searching for the vehicle in a parking lot. Other services and remote operations may be supported by the telematics unit 12, and new services may be added through updates to the digital rights management application 22.

In an embodiment, the wireless connection to the telematics unit 12 may be a Bluetooth wireless connection via the Bluetooth transceiver 28 established directly with the mobile phone 40 or another mobile electronic device containing a Bluetooth transceiver 44. There may be times when the telematics unit 12 is unable to access the network 16 due to a weak signal, or when it is more convenient to send a remote operation request directly from the mobile phone 40. A local wireless connection between the Bluetooth transceiver 28 in the telematics unit 12 and the Bluetooth transceiver 44 in the mobile phone 40 can be created to couple the two devices. Once coupled, the application 48 executing on the mobile phone 40 may be used to generate a remote operation request. The remote operation request is encoded with digital rights management by the digital rights management application 50 on the mobile phone 40, and the encoded remote operations request is sent to the telematics unit 12 via the Bluetooth link between the two devices.

In an embodiment, the telematics unit 12 does not contain a radio transceiver 26. The telematics unit 12 in the vehicle may not be equipped with a radio transceiver 26, and therefore may not have a built-in capability to communicate directly with the base transceiver station 14 and therefore with the network 16. A local wireless connection may be established as previously described, but another alternative may be to connect to the network 16 using the mobile phone 40 as a router. Using the Bluetooth transceiver 28, the telematics unit 12 may be able to link to the Bluetooth transceiver 44 in the mobile phone 40 and use the mobile phone 40 as a router to communicate with the network 16. This would allow the normal remote operation functions to be available on the telematics unit 12 whenever the Bluetooth link with the mobile phone 40 is established.

In an embodiment, the merchant transaction server 60 is coupled to the wireless service provider network 16. When a change is made to the digital rights management application 22 on the merchant transaction server 60, a notification is sent from the merchant transaction server 60 to the devices using the digital rights management application associated with the update, such as the telematics unit 12. For example, a vehicle owner may choose to subscribe to a vehicle diagnostic service to automatically monitor the vehicle's engine and report any issues detected. The digital rights management application 22 is modified to incorporate the authorization for the updated subscription, and is updated on the merchant transaction server 60. Notifications to update the digital rights management application 22 to receive the updated authorization settings may then be sent to the telematics unit 12 in the vehicle, to the remote operations server 70, and to the mobile phone 40.

In an embodiment, the telematics unit 12 implements a Java virtual machine, and the digital rights management application 22 is a Java application executing in the Java virtual machine. A virtual machine is a software implementation of a computer that executes programs like a physical computer. A Java virtual machine is a virtual machine capable of executing Java applications. Implementing the digital rights application 22 as a Java application allows for increased flexibility and more simple updates than were possible with the previous scripting client executing in the firmware of the telematics unit 12. It also removes the dependency on the network 16 to perform the digital rights management and to send a vehicle specific script to the telematics unit 12, allowing for local wireless connections over which remote operations commands can be sent to the telematics unit 12 directly.

Figure 3:
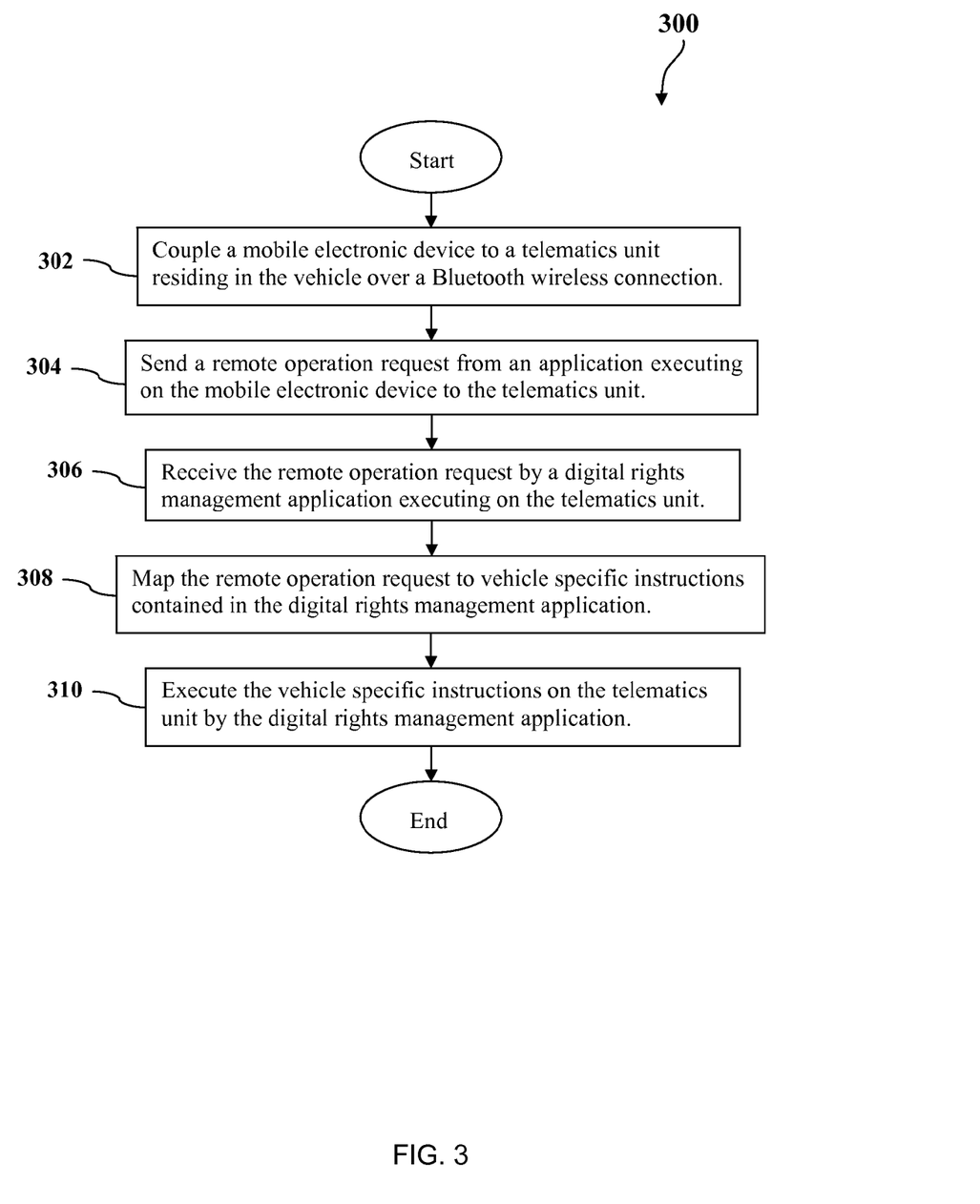
FIG. 3 is a flow chart of a method according to an embodiment of the disclosure.

Turning now to FIG. 3, a method 300 of alternative authorization for Next Generation Telematics Pattern (NGTP) in a vehicle is described. At block 302, a mobile phone 40 is coupled over a Bluetooth wireless connection to a telematics unit 12 residing in the vehicle. Bluetooth is a wireless technology standard for exchanging data over short distances. Coupling the mobile phone 40 with the telematics unit 12 creates a local wireless network for communicating between the two devices. At block 304, a remote operation request is sent from a digital rights management application 50 executing on the mobile phone 40 to the telematics unit 12. The digital rights management application 50 encodes the remote operation request with digital rights management prior to sending the request over the Bluetooth wireless connection. At block 306, the remote operation request is received by a digital rights management application 22 executing on the telematics unit 12. The digital rights management application 22 decodes the remote operation request and verifies the mobile phone 40 is authorized to issue remote commands to the telematics unit 12. At block 308, the remote operation request is mapped to vehicle specific instructions 24 contained in the digital rights management application 22. The remote operation request is an abstracted command which is translated into individual functions specific to the vehicle, which may require multiple vehicle specific instructions 24 to complete the abstracted command. At block 310, the vehicle specific instructions 24 are executed on the telematics unit 12 by the digital rights management application 22. Executing the vehicle specific instructions 24 performs the action requested in the remote operation request.

In an embodiment, the method 300 further comprises the telematics unit 12 entering a low power mode to conserve battery when the vehicle is not running. The low power mode may allow periodic checks to identify if a network 16 or a Bluetooth wireless connection is available and if a network 16 or a Bluetooth wireless connection is available the telematics unit 12 checks for remote operation requests to process. Operating in a low power mode limits the risk of the telematics unit 12 draining the vehicle battery and preventing the vehicle from starting while still remaining available to execute remote commands.

In an embodiment, the low power mode comprises defined states which determine a frequency with which the telematics unit 12 checks for connectivity. The defined states may be based on an elapsed time since entering the low power mode. For instance, for the first 5 minutes after entering the low power mode the telematics unit 12 may be in low power state 1, at 5 minutes until 15 minutes have elapsed the telematics unit 12 is in low power state 2, from 15 minutes until 60 minutes have elapsed the telematics unit is in low power state 3, and after 60 minutes the telematics unit 12 enters low power state 4. It is understood that different durations for each of the defined states are also consistent with the present disclosure.

The current low power state determines how often the telematics unit will perform a check for radio and Bluetooth connectivity and remote operation requests. While in low power state 1, the telematics unit 12 may check every second for connections and requests. As the elapsed time in low power mode grows, the telematics unit 12 may check less frequently to conserve battery power, for example checking only every 5 seconds during low power state 2 and every 15 seconds during low power state 3. Upon reaching low power state 4, the telematics unit may check every 60 seconds. It is understood that different rates of performing connectivity checks for each defined state are also consistent with the present disclosure. Additional low power states may also be defined in the telematics unit 12 for longer elapsed time periods to further reduce the power use over time, for example when on vacation when the vehicle is not used for an extended period of time.

In an embodiment, the method 300 further comprises the telematics unit 12 using the Bluetooth wireless connection to link to the network 16, for example to a wireless service provider network, via the mobile electronic device. The mobile phone 40 may connect to the network 16 via the radio transceiver 42 and to the telematics unit 12 via the Bluetooth transceiver 44. The telematics unit 12 may then be able to link to the network 16 using the mobile phone 40 as a router, allowing normal remote operation functions to be available on the telematics unit 12 whenever the Bluetooth link with the mobile phone 40 is established.

In an embodiment, the digital rights management application 50 executing on the mobile phone 40 sends the remote operation request via the network 16 when a Bluetooth wireless connection to the telematics unit 12 is not present. In addition to the Bluetooth transceiver 44, the mobile phone 40 comprises a radio transceiver 42 capable of coupling to the wireless service provider network 16. The remote operation request may be sent to the remote operations server 70 via the radio transceiver 42 when the Bluetooth link to the telematics unit 12 is not present. The remote operations server 70 may then send the remote operation request to the telematics unit 12 via the network 16.

In an embodiment, the method 300 additionally comprises a digital rights management application 50 executing on the mobile phone 40, where the remote operation request is encoded with digital rights management by the digital rights management application 50. The digital rights management application 50 receives a selection of a remote command from an application 48 executing on the mobile phone 40 and encodes a remote operation request with digital rights management based on the selection. The remote operation request is then sent by the digital rights management application 50 to the telematics unit 12 via the Bluetooth wireless connection.

In an embodiment, the digital rights management application 22 on the telematics unit 12 decodes the remote operation request and determines if the mobile phone 40 is authorized to execute remote operations on the telematics unit 12. Implementing the digital rights management in the telematics unit 12 enables the ability to support remote commands over Bluetooth wireless connection when the wireless network 16 is inaccessible. For security purposes, remote operations may only be allowed from specific phones registered with the telematics service provider. The digital rights management application 22 may verify that the remote operation request is from an authorized mobile phone 40 and that the vehicle is subscribed to the requested service.

Figure 4:
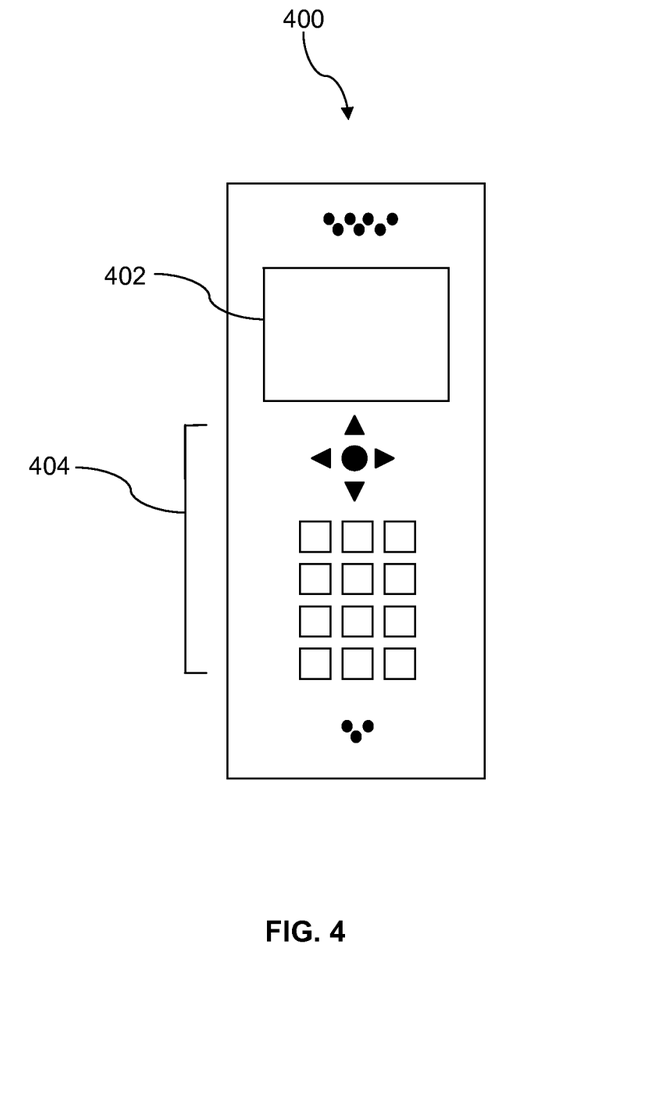
FIG. 4 is an illustration of a mobile device according to an embodiment of the disclosure.

FIG. 4 shows a wireless communications system including the mobile device 400. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
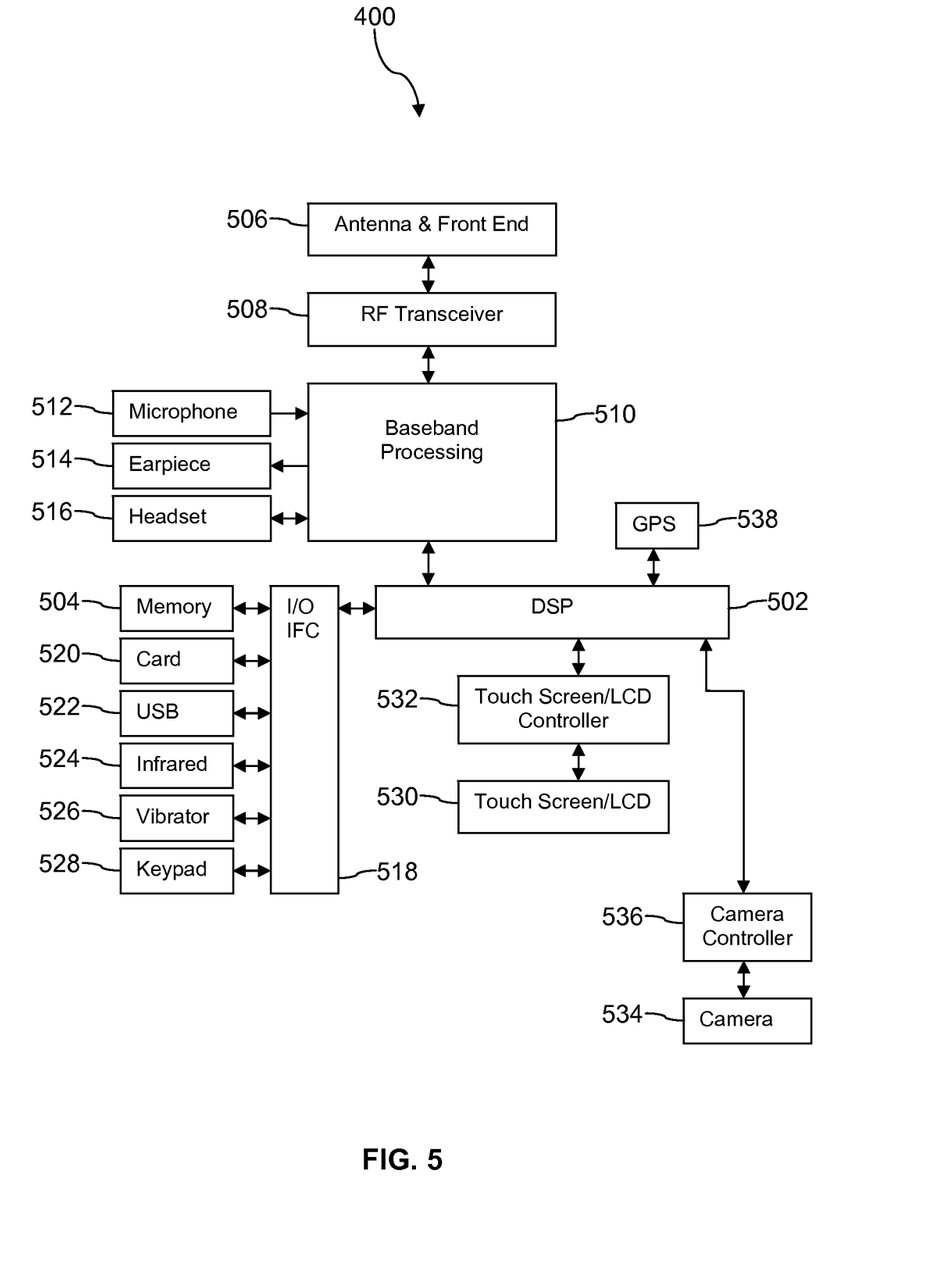
FIG. 5 is a block diagram of a mobile device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
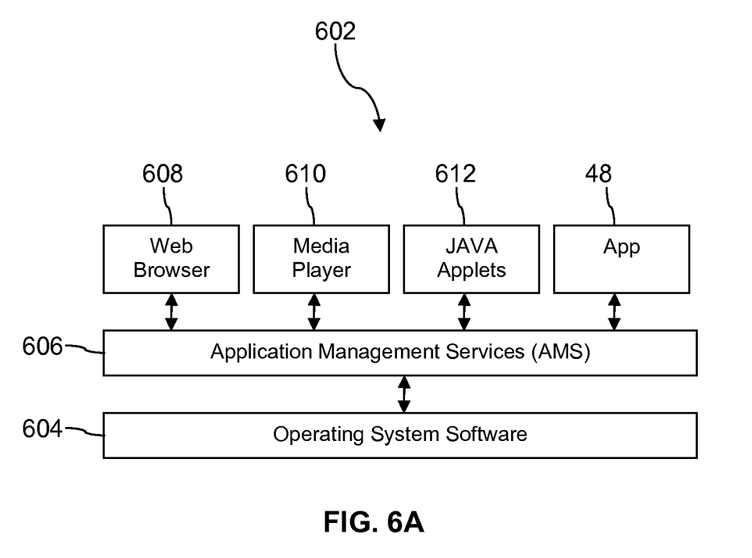
FIG. 6A illustrates a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
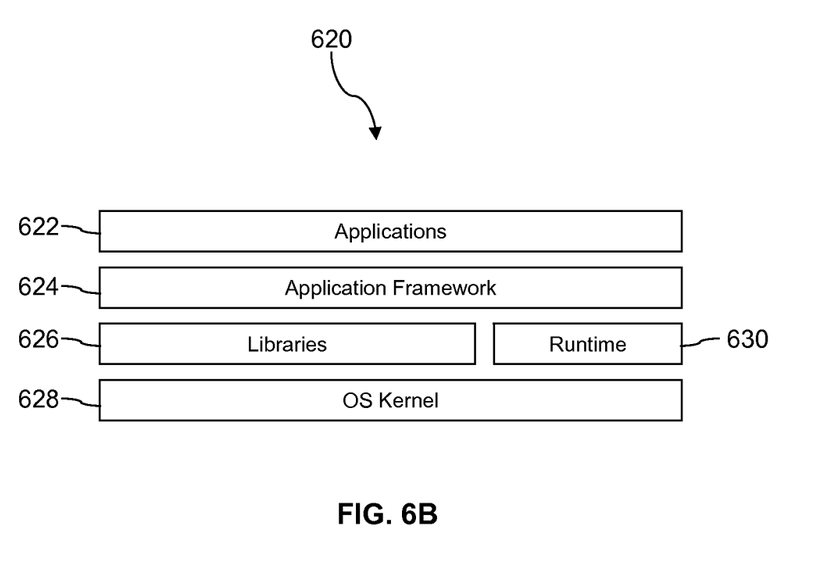
FIG. 6B illustrates another software architecture according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
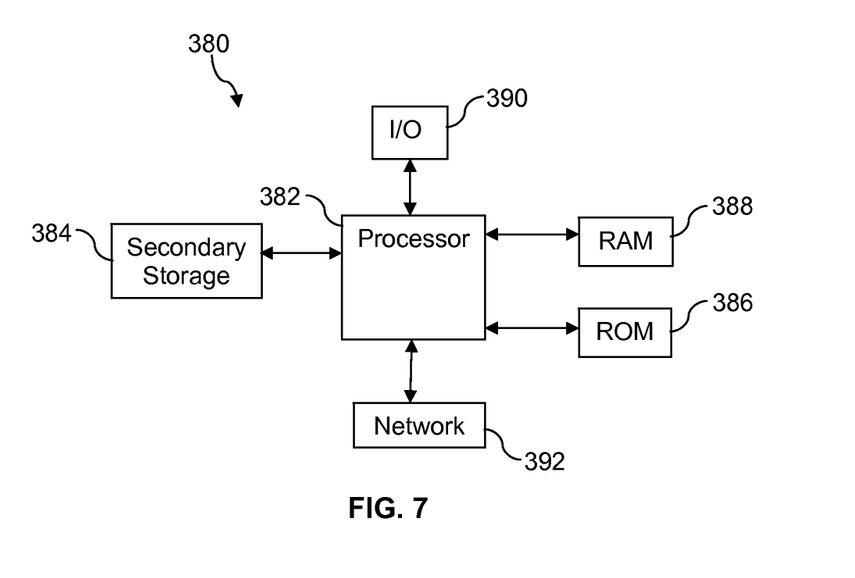
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for authorizing a request utilizing telematics in a vehicle, comprising:
    receiving, by a digital rights management application executing on a telematics unit residing in the vehicle, a remote operation request, wherein the remote operation request comprises one or more abstracted remote operation commands, and wherein the one or more abstracted remote operation commands are abstracted commands that request a high-level function to be performed for the vehicle;
    translating, by the digital rights management application, the one or more abstracted remote operation commands in the remote operation request to vehicle specific instructions contained in the digital rights management application, wherein the vehicle specific instructions comprise one or more individual functions specific to the vehicle; and
    executing, by the digital rights management application, the vehicle specific instructions on the telematics unit, wherein the digital rights management application executes the receiving, the translating, and the executing in a Java runtime environment.

2. The method of claim 1, wherein the remote operation request is encoded using digital rights management.

3. The method of claim 1, wherein the remote operation request is decoded by the digital rights management application, and wherein the digital rights management application determines if the remote operation request is authorized to execute remote commands on the telematics unit.

4. A system for authorizing a request utilizing telematics in a vehicle, comprising:
    a telematics unit residing in the vehicle;
    a radio transceiver, wherein the radio transceiver couples the telematics unit with a wireless service provider;
    a digital rights management application executing on the telematics unit, wherein the digital rights management application receives a remote operation request that comprises one or more abstracted remote operation commands, translates the one or more abstracted remote operation commands in the remote operation request to vehicle specific instructions contained in the digital rights management application, and executes the vehicle specific instructions on the telematics unit,
    wherein the one or more abstracted remote operation commands are abstracted commands that request a high-level function to be performed for the vehicle, and wherein the vehicle specific instructions comprise one or more individual functions specific to the vehicle.

5. The system of claim 4, wherein the telematics unit implements a Java virtual machine and the digital rights management application is a Java application executing the receives, the translates, and the executes steps in the Java virtual machine.

6. The system of claim 4, wherein the radio transceiver provides a wireless communication link to the wireless service provider according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol.

7. The system of claim 4, wherein the vehicle specific instructions comprise at least one of a lock/unlock vehicle request, a start/stop vehicle request, and a lights on/off vehicle request.

8. The system of claim 4, wherein the digital rights management application decodes the remote operation request and determines if the request is authorized to execute remote operations on the telematics unit.

9. The system of claim 4, further comprising a merchant transaction server coupled to the wireless service provider network, wherein the merchant transaction server comprises a digital rights management application.

10. The system of claim 9, wherein the telematics unit receives a notification to update the digital rights management application on the telematics unit from the merchant transaction server based on changes to the digital rights management application on the merchant transaction server.

11. The system of claim 4, wherein the remote operation request is received from a remote operations server, and wherein the remote operation request is encoded using digital rights management by the remote operations server.

12. A method for authorizing a request utilizing telematics in a vehicle, comprising:
coupling a mobile electronic device to a telematics unit residing in the vehicle over a Bluetooth wireless connection;
sending, by an application executing on the mobile electronic device, a remote operation request to the telematics unit, wherein the remote operation request comprises one or more abstracted remote operation commands, wherein the one or more abstracted remote operation commands are abstracted commands that request a high-level function to be performed for the vehicle, and wherein the one or more abstracted remote operation commands do not provide vehicle specific instructions for performing the high-level function;
receiving, by a digital rights management application executing on the telematics unit, the remote operation request;
translating, by the digital rights management application, the one or more abstracted remote operation commands in the remote operation request to vehicle specific instructions contained in the digital rights management application, wherein the vehicle specific instructions comprise one or more individual functions specific to the vehicle; and
executing, by the digital rights management application, the vehicle specific instructions on the telematics unit.

13. The method of claim 12, further comprising entering, by the telematics unit, a low power mode to conserve battery when the vehicle is not running.

14. The method of claim 13, wherein the low power mode comprises defined states which determine a frequency with which the telematics unit checks for connectivity.

15. The method of claim 12, further comprising using, by the telematics unit, the Bluetooth wireless connection to link to a wireless service provider network via the mobile electronic device.

16. The method of claim 12, wherein the application executing on the mobile electronic device sends the remote operation request via a wireless service provider network when a Bluetooth wireless connection to the telematics unit is not present.

17. The method of claim 12, wherein the mobile electronic device comprises a digital rights management application, and wherein the remote operation request is encoded using digital rights management by the digital rights management application on the mobile electronic device.

18. The method of claim 12, wherein the digital rights management application on the telematics unit decodes the remote operation request, and wherein the digital rights management application on the telematics unit determines if the mobile electronic device is authorized to execute remote operations on the telematics unit.

19. The method of claim 17, further comprising receiving, by the mobile electronic device, a notification to update the digital rights management application on the mobile device from a merchant transaction server based on changes to a digital rights management application on the merchant transaction server.

20. The method of claim 12, wherein the digital rights management application executes the receiving, the translating, and the executing in a Java runtime environment.

* * * * *